United States Patent [19]

Wehnert et al.

[11] Patent Number: 4,568,244
[45] Date of Patent: Feb. 4, 1986

[54] FIBER REINFORCED/EPOXY MATRIX COMPOSITE HELICOPTER ROTOR MAIN HUB PLATE

[75] Inventors: George J. Wehnert, Madison, Conn.; Francis E. Byrnes, Jr., White Plains, N.Y.; Peter C. Ogle, Woodbridge, Conn.

[73] Assignee: United Technologies Corporation, Hartford, Conn.

[21] Appl. No.: 477,696

[22] Filed: Mar. 22, 1983

[51] Int. Cl.$^4$ ............................................. B64C 11/06
[52] U.S. Cl. ................................ 416/134 A; 416/230; 416/244 R
[58] Field of Search .......... 416/134 A, 230 A, 138 A, 416/244 R, 244 D, 141

[56] References Cited

U.S. PATENT DOCUMENTS

| | | | |
|---|---|---|---|
| 4,156,583 | 5/1979 | Mayerjak | 416/230 A X |
| 4,195,967 | 4/1980 | Weiland | 416/138 A X |
| 4,257,738 | 3/1981 | Schwarz et al. | 416/230 A X |
| 4,293,276 | 10/1981 | Brogdon et al. | 416/134 A |
| 4,321,013 | 3/1982 | Schwarz et al. | 416/244 R |
| 4,342,540 | 8/1982 | Lovera et al. | 416/141 X |
| 4,352,632 | 10/1982 | Schwarz et al. | 416/230 A X |
| 4,425,082 | 1/1984 | Mussi et al. | 416/134 A X |
| 4,427,340 | 1/1984 | Metzger et al. | 416/141 |

FOREIGN PATENT DOCUMENTS 3037824  5/1982  Fed. Rep. of Germany ... 416/230 A

Primary Examiner—Everette A. Powell, Jr.
Attorney, Agent, or Firm—Alan C. Cohen

[57] ABSTRACT

A helicopter hub main retention plate is described made up of graphite and glass fiber reinforced epoxy resin. The graphite fiber reinforcement is in-plane isotropically laid continuous graphite fibers and the glass fiber reinforcement comprises segments of fiberglass continuously and circumferentially wound around the areas of retention. Such materials and configuration provide crack resistance, damage tolerance, and integrity inspectability to the retention plate.

1 Claim, 4 Drawing Figures

MAIN RETENTION PLATE

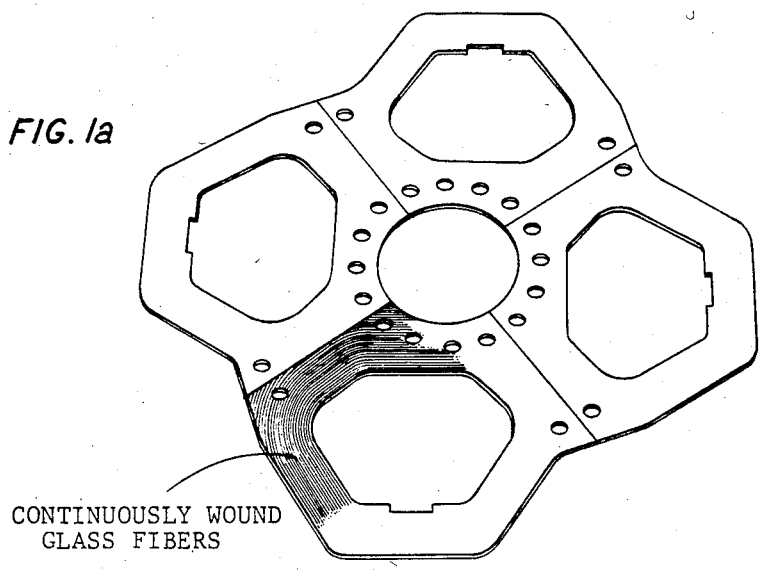
FIG. 1a
CONTINUOUSLY WOUND
GLASS FIBERS
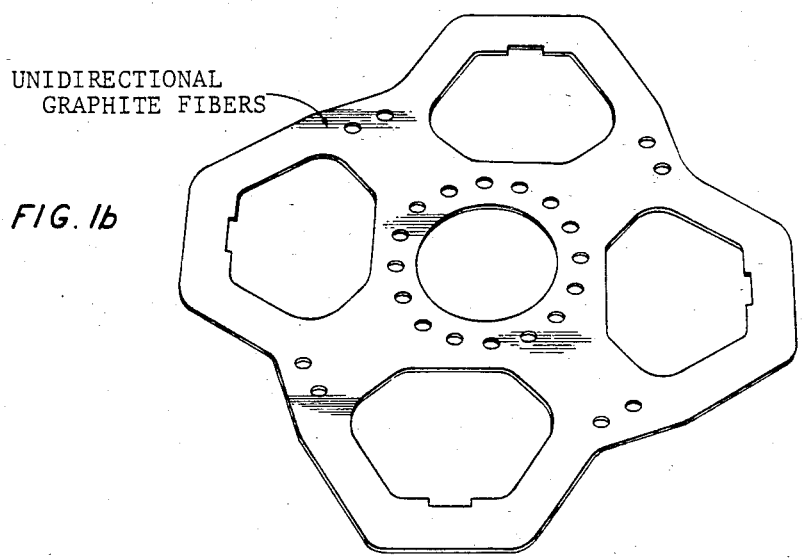
UNIDIRECTIONAL
GRAPHITE FIBERS
FIG. 1b
FIG. 2
GLASS                                    GRAPHITE

FIBER REINFORCED/EPOXY MATRIX COMPOSITE HELICOPTER ROTOR MAIN HUB PLATE

CROSS REFERENCE TO RELATED APPLICATIONS

Attention is directed to the following copending, commonly assigned U.S. patent applications, filed on even date herewith: Ser. No. 477,701. Filing date Mar. 22, 1983 filed in the names of Peter C. Ogle, Edward S. Hibyan and Thomas J. Toner and entitled "Fiber Reinforced/Epoxy Matrix Composite Helicopter Rotor Yoke"; Ser. No. (477,709). Filing date Mar. 22, 1983 filed in the names of Peter C. Ogle, George J. Wehnert, Thomas J. Toner, Francis E. Byrnes, Jr., and Edward S. Hibyan and entitled "Fiber Reinforced/Epoxy Matrix Composite Helicopter Rotor Torque Tube"; and Ser. No. (477,708). Filing date Mar. 22, 1983 filed in the names of Peter C. Ogle, George J. Wehnert, Thomas J. Toner, Francis E. Byrnes, Jr. and Edward S. Hibyan and entitled "Composite Helicopter Rotor Hub".

DESCRIPTION

1. Technical Field

The field of art to which this invention pertains is helicopter rotor hub plates and particularly hub plates comprising fiber reinforced epoxy matrix composites.

2. Background Art

Historically, helicopter main rotor hubs have been made of high strength, lightweight, critical metals or alloys. Although these metal components have performed adequately, there are a number of drawbacks inherent to these materials. Three important areas where these materials possess less than optimum features are weight, availability and fail-safeness.

Weight has always been a consideration in helicopter construction and with increasing fuel costs it has become a primary objective, i.e. to reduce the weight of the overall helicopter by using lighter materials. At present aluminum and titanium are used extensively because of their light weight and strength, however, there is a constant search for lighter and stronger materials. In addition, these lightweight metals are classified as "critical" materials with their primary availability being through importation. As has been demonstrated by the oil embargoes of past years, reliance on foreign sources for these materials is not desirable. Furthermore, these metals do not impart a damage tolerance to their components That is, when a metal component starts to weaken, through fatigue or otherwise, cracks are generated. These cracks continue to grow quickly as there is nothing to stop their propagation and the component part can fail completely. As can be appreciated, this lack of damage tolerance can be disastrous in a helicopter.

In order to overcome the shortcomings of such metal components, the industry has taken two approaches. One is to build a redundant component so that should one fail the other will allow for a safe landing. The second is to overdesign the particular part such that it would have much greater strength than would normally be required under normal circumstances. Both of these approaches add weight to the aircraft as well as increased cost and reliance on critical metals.

Recently, composite materials have been used as replacement parts for many metal components due to their light weight and relatively low cost. For example, composite materials are now being used in main structural components such as main rotor blades and tail rotor assemblies on helicopters. However, it is not always practical to replace a metal component with a composite material due to particular design considerations and shortcomings in the composite physical properties.

Composite rotor hubs have been designed using a laminated structure of fiber reinforced resin e.g. note British Pat. No. 2,092,541. Such hubs are of such complicated design as to make them costly to fabricate, and having fewer component parts, produce an increased number of failure points.

Accordingly, what is needed in this art are relatively inexpensive and light weight composite components capable of withstanding the forces developed in a helicopter rotor hub assembly.

DISCLOSURE OF THE INVENTION

The present invention is directed to a main helicopter rotor hub composite main retention plate. The plate is made up of layers of graphite fibers and glass fibers laid up and interleaved in an epoxy resin matrix in specific manner. The glass fibers are present as segments of continuous fibers wound in a plane circumferentially around the central axes of the areas of retention. The graphite fibers are continuous fibers in-plane isotropically laid in a plane parallel to the plane of the glass fibers. The layers of fibers are symmetrically interleaved so as to provide light weight, strength, crack resistance, damage tolerance and integrity inspectability to the retention plate, without the need for redundant parts or overdesigned components.

BRIEF DESCRIPTION OF THE DRAWINGS

FIG. 1a shows the continuously wound glass fibers of the retention plate according to the present invention.

FIG. 1b shows a single unidirectional ply of graphite fiber reinforcement according to the present invention.

FIG. 2 shows a sectional view of a retention plate according to the present invention.

BEST MODE FOR CARRYING OUT THE INVENTION

Figure 3:
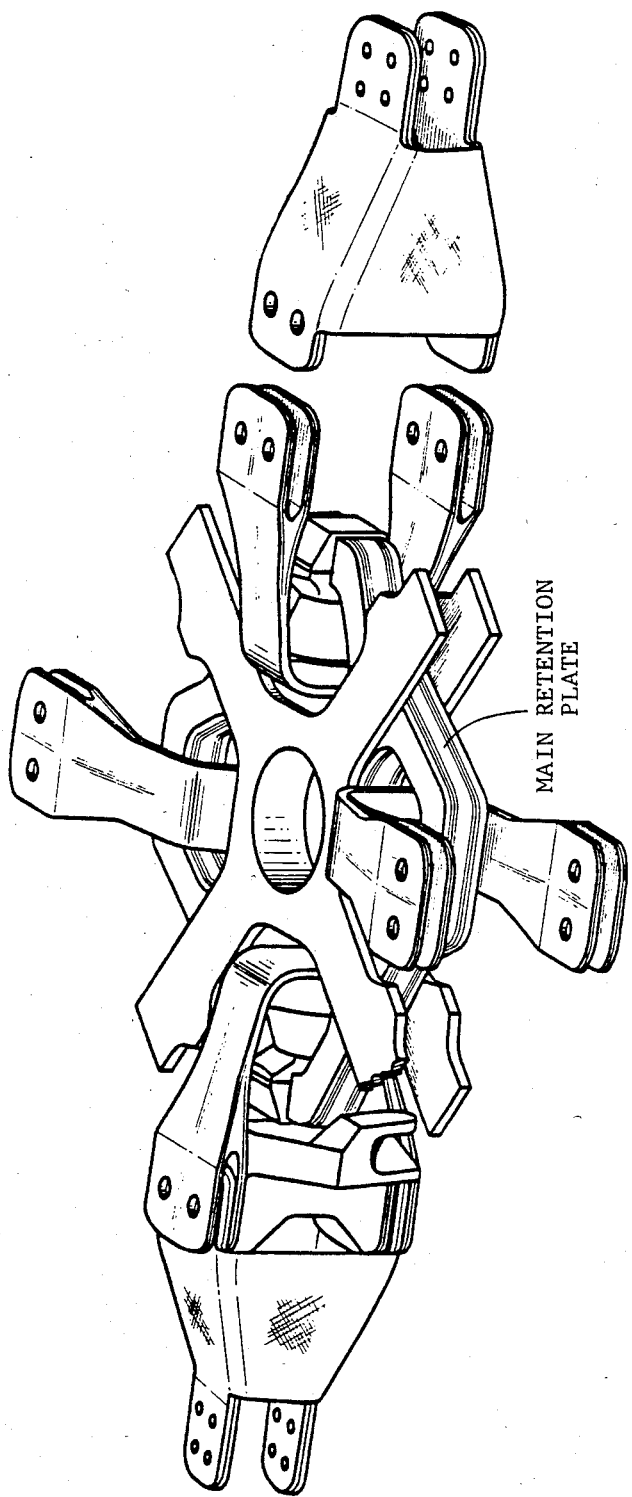
FIG. 3 shows a composite rotor hub assembly containing a retention plate according to the present invention.

As the graphite fiber reinforcement, high strength graphite fiber may be used which has a minimum filament modulus of $30 \times 10^6$ psi. These filaments may be purchased preimpregnated with an epoxy resin in the form of a multifilament collimated graphite tape in sheet form from Narmco Materials Inc., Costa Mesa, Calif. These tapes range anywhere from about 1 to about 18 inches wide and are typically used with a width of about 12 inches. In this sheet form each sheet or ply of the graphite fiber bundles is about 0.012 inch in thickness, although sheets with 0.006 inch thicknesses are also available. The cured graphite/resin composite should contain about 50% to about 65% fibers by volume and a unidirectional cured layer should have a tensile modulus of about $17 \times 10^6$ to about $20 \times 10^6$ psi at room temperature. The individual fibers are generally about 0.35 to about 0.399 mil in diameter.

The graphite fibers are generally laid up as a pack of multiples of four sheets or plies, laid up in a 0° orientation, +45°, 90°, −45° respectively, to impart optimum physical properties to the pack. With the fibers thus oriented in the pack, the average or effective tensile modulus of the pack will be about $7 + 10^6$ psi which is substantially the same as the tensile modulus of the unidirectionally oriented glass fiber lay-up.

While any glass fiber material with the requisite physical properties can be used, the preferred glass fiber is an S-type which can also be obtained preimpregnated with epoxy resin from Narmco Materials Inc. The cured glass fiber/resin layer should have about 45% to about 60% fiber content by volume and a tensile strength of about 125,000 psi minimum as well as a longitudinal tensile modulus of about $5.1 \times 10^6$ to about $6.3 \times 10^6$ psi both measured at room temperature. As with the graphite fibers, the preimpregnated glass fibers are available in fiber bundle tows anywhere from 1/10 inch to 1 inch in width and about 0.0125 inch in thickness. Such tows cure out to a thickness of about 0.010 inch and are typically used in ⅛ inch widths.

The epoxy resin matrix should be selected so as to be compatible with the fiber reinforcement. It is also desirable that the epoxy resin be satisfactorily curable at low pressures i.e. about 20 to about 100 psig. Three such resin systems are available commercially, two from U.S. Polymeric designated as Resin Number 773 and Resin Number E7K8, and the other from Narmco Materials Inc. designated as Resin Number 5225.

The graphite fibers are generally laid up first. They are in-plane isotropically laid, at angles of 0°, +45°, 90° and −45°. Also as stated above, while the graphite fibers can be laid up and subequently treated with the epoxy resin either by brushing or otherwise applying a coating composition of suitable carrier of the epoxy resin or resin coated just prior to laying up, the fibers are preferrably laid up as commercially purchased, i.e. preimpregnated with the epoxy resin.

In laying up the fibers for the retention plate, the amount of graphite fibers should be at least equal to the amount of fiberglass fibers in the composite. While an excess of graphite fibers can be tolerated, an excess of fiberglass is not desirable, especially in a series of adjacent sheets. This is particularly necessary for adjacent sheets because of the split plane between the fiberglass segments as shown in FIG. 1. With insufficient graphite fibers bridging these splits, structural failure of the retention plate could occur under load. Ideally, the thicknesses of graphite fiber layers are equal to the thicknesses of adjacent glass fiber layers throughout the composite plate, but certainly in the areas occupied by the glass fiber layers. Note FIG. 2.

As shown in FIG. 1 the glass fibers are laid up in four discrete sections, each section made up of a continuously wound glass fiber bundle, helically wound around the central axis of retention. When these sections are thus formed, they are formed such that the internal load path will always be along the length of the fibers.

Since the segments of glass fibers or "doilies" have a cured out thickness of about 0.010 inch (being ⅛ inch wide and helically wrapped widthwise in jelly-roll fashion) and the plies of graphite fibers have a thickness of about 0.012 inch, the retention plate as shown in FIG. 2 is formulated by laying up approximately 8 plies of the graphite fiber preimpregnated sheets in alternating orientation of 0°, +45°, 90°, −45°, followed by a laying up of 1 sheet of the preimpregnated glass fiber reinforcement, and the process repeated three times to obtain the first three laid up glass fiber layers. A thick mid-section of graphite plies is next laid up followed by a repeat of the above alternating ply stack lay-ups. For this particular plate, the glass fibers were kept away from the midplane resulting in greater shear stress properties at the midplane.

Each pack of 0°, +45°, 90°, −45° graphite is cut to size with all of the major cavities cut out, using a clicker die. The unidirectional fiberglass wafers are first filament wound around a mandrel that is shaped to the retention cavity dimensions. Then they are clicker die cut to form the quarter segment. The four sections are assembled on a layer of woven fiberglass to keep the pieces in proper position so the holes may be clicker die cut. The graphite plies also have the holes clicker cut in a secondary operation of multi-layer stack-ups. The graphite packs and the fiberglass wafers are then layered into a net size mold. It is then press molded to proper thickness using a time/temperature/pressure distribution established for the resin system being used. Typically epoxy resin systems are used which cure at about 340° F. to about 360° F., at pressures of about 60 psig to about 100 psig, in about 2 to about 4 hours. In this instance, the entire assembly is placed in a hot press and heated to approximately 350° F. at approximately 80 psig for approximately 2 hours to compress the assembly and cure the epoxy resin. The result is a main hub plate requiring only upper surface grinding for fine tolerances, reaming of the center hole for tight tolerance fit to the shaft and drilling of the attachment holes. (In view of the upper surface grinding, typically a nonsymmetrical excess of graphite will be laid up in the uppermost portion of the plate to account for such grinding).

There should be enough glass fiber in the retention plate so that the glass fiber alone is sufficient to carry the entire projected load for that particular load bearing area for a short duration (e.g. a matter of hours). A good rule of thumb for the plate is that the amount of fiberglass wrap used should be sufficient to carry a 125% RPM centrifugal loading alone. The glass fiber thus provides a redundant load path as well as being a crack stopping agent interleaved within the graphite. It should be noted that the gross elastic modulus of the 0°, +45°, 90°, −45° graphite pack is very close to that of unidirectional fiberglass. This results in a very even loading of the material within the main hub plate, and keeps the shear stress low between the two materials. In other words, all of the material is working evenly.

As mentioned above, the thickness of the retention plate is a function of the bending and axial loads projected for the part to see. Ideally the glass fiber and graphite layers will be equally spaced throughout the retention plate. However, also as stated above, typically, only so much fiberglass is used to carry the entire projected load for short durations, and such fiberglass is laid up on the outermost sections of the plate with a thicker graphite fiber mid-section as shown in FIG. 2. It should also be noted that by virtue of matching the thicknesses of fiberglass to the thicknesses of graphite in adjacent layers that a uniformity of load carrying capability and stress strain properties is imparted to the retention plate throughout its entire thickness. In general the ratio of fiberglass to graphite fiber in the retention plate will be about 1 to 1 to about 1 to 3. While there is no limit on the amount of graphite fiber which can be present in the retention plate, a balance is generally made of weight considerations and overall physical properties needed for the particular design of retention plate, i.e. the stress-strain and load bearing limits required for any particular retention plate.

Through the selection of these particular materials and the unique configuration described, a relatively lightweight, non-critical material, damage tolerant, less notch sensitive, component results. The component exhibits a unique combination of interlaminar shear strength, flexibility and crack resistance.

In order to evaluate the main hub, a quarter segment of the main hub plate (see FIG. 1) was fabricated and tested by placing it in an ultimate load test apparatus which applied outward pressure axially on opposing arms of the segment. Such tests demonstrated load carrying capabilities in excess of 100,000 lbs. and strain level capabilities in excess of 9,000 $\mu$in./in. This further demonstrated that the addition of the glass fibers for damage tolerant purposes did not reduce the ultimate load capability and the unique combination and orientation of fibers and matrix provided the lightest weight, highest structural component capability available.

The advanced retention plate of the present invention has many advantages over the existing metal hubs used. The first and foremost is the features which are built into the retention plate which are in addition to the safe life (overall part life) design. The composite plate weight projection will result in at least a 20% weight savings in addition to being stronger and lighter than existing systems. The number of parts will be reduced by approximately 12%. Materials and manufacturing costs should be lower than with existing systems and due to the simpler design and greater accessability it will be easier to replace parts. The inherent damage tolerance of the composite retention plate will extend the useful life of the hub and improve the repairability which will also reduce the operational costs. By damage tolerance is meant that the state of the structure where either damaged or having defects will have sufficient strength such that a resulting crack will be detected in a routine inspection prior to becoming critical.

Although this invention has been shown and described with respect to detailed embodiments thereof, it will be understood by those skilled in the art that various changes in form and detail thereof may be made without departing from the spirit and scope of the claimed invention.

We claim:

1. A helicopter hub main retention plate comprising a fiber reinforced epoxy resin matrix having a plurality of layers of:
   a. graphite fiber reinforcement comprising in-plane isotropically laid continuous graphite fibers,
   b. glass fiber reinforcement comprising a plurality of glass fiber segments circumferentially wound around a central axis in a plane substantially parallel to the plane of the graphite fiber reinforcement, said layers of graphite and glass fiber reinforcement symmetrically interleaved so as to produce crack resistance, damage tolerance, and integrity inspectability to the retention plate.

* * * * *